United States Patent [19]

Woodbrey

[11] 4,346,200
[45] Aug. 24, 1982

[54] THERMOPLASTIC POLYAMIDE COMPOSITIONS

[75] Inventor: James C. Woodbrey, Chesterfield, Mo.

[73] Assignee: Monsanto Company, St. Louis, Mo.

[21] Appl. No.: 220,939

[22] Filed: Dec. 29, 1980

[51] Int. Cl.³ .............................................. C08L 77/00
[52] U.S. Cl. .................................. 525/421; 525/408; 525/411; 525/431; 525/432; 525/415
[58] Field of Search ............... 525/430, 431, 432, 408, 525/411

[56] References Cited

U.S. PATENT DOCUMENTS

| | | | |
|---|---|---|---|
| 3,514,498 | 5/1970 | Okazaki | 525/430 |
| 3,549,724 | 12/1970 | Okazaki | 525/430 |
| 3,632,666 | 1/1972 | Okazaki | 525/432 |
| 3,636,135 | 1/1972 | Garforth | 525/432 |
| 3,639,502 | 2/1972 | Okazaki | 525/432 |
| 3,655,821 | 4/1972 | Lofquist | 525/430 |
| 3,655,822 | 4/1972 | McGrath | 260/837 TW |
| 3,839,245 | 10/1974 | Schlossman | 525/430 |
| 3,862,262 | 1/1975 | Hedrick | 528/310 |
| 3,946,089 | 3/1976 | Furukawa | 525/408 |
| 4,031,164 | 6/1977 | Hedrick | 525/426 |
| 4,034,015 | 7/1977 | Hedrick | 525/426 |
| 4,085,163 | 4/1978 | Gergen | 260/857 D |
| 4,174,358 | 11/1979 | Epstein | 525/183 |
| 4,218,549 | 8/1980 | Jadamus | 525/420 |
| 4,223,112 | 9/1980 | Hedrick | 525/426 |
| 4,242,470 | 12/1980 | Gergen | 525/92 |

*Primary Examiner*—Paul Lieberman
*Attorney, Agent, or Firm*—P. D. Matukaitis; E. P. Grattan; S. M. Tarter

[57] ABSTRACT

Polyamide compositions comprising:
(a) at least one polyamide resin of number average molecular weight of at least 5000; and
(b) at least one block polymer having (i) from about 30 to about 70 weight percent polyamide segments selected from

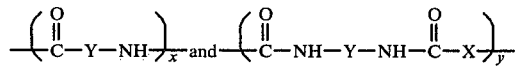

wherein x is an integer equal to five or more and y is an integer equal to three or more;

(ii) from about 70 to about 30 weight percent of segments having a molecular weight of at least 300 selected from the group consisting of segments of poly(ethylene oxide), poly(propylene oxide), polycaprolactone, polytetrahydrofuran, polybutadiene, polyisoprene, polyisobutylene, poly($C_1$-$C_8$ alkylene acrylate), poly($C_1$-$C_4$ dialkylene siloxane), poly(ethylene-co-propylene), poly(ethylene-co-carbon monoxide) and combinations thereof; said (ii) segments being connected to an (i) polyamide segment through groups selected from amide, ester, urea, carbamate and imide; and (iii) greater than 0.05 milliequivalents of

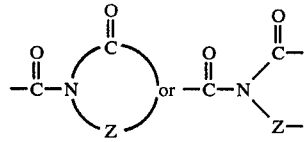

groups per gram of (b); wherein Y and Z are alkylene having from about 3 to about 14 carbon atoms and X is arylene or alkylene having from about 3 to about 14 carbon atoms;

provided that the composition contains from about 10 to about 90 weight percent of Component (a) and from about 90 to about 10 weight percent of Component (b).

12 Claims, No Drawings

THERMOPLASTIC POLYAMIDE COMPOSITIONS

BACKGROUND OF THE INVENTION

1. Field of the Invention

This invention relates to thermoplastic polyamide compositions, more particularly, to thermoplastic compositions comprising a polyamide and a block polymer containing polyamide segments and other polymeric segments.

2. Description of the Prior Art

Polyamides are commonly employed as engineering thermoplastics. The balance of properties comprising strength, stiffness, impact resistance and dimensional stability makes polyamides especially attractive as replacements for metals in various structural applications, particularly in automotive applications because of the reduction in weight that can often be achieved.

Although unmodified thermoplastic polyamides have many uses as an engineering thermoplastic, considerable efforts in the prior art have been made toward achieving improved properties for polyamide engineering thermoplastics. Such efforts are typically directed at improving a particular property or at improving the combination of properties of the polyamide resin to make it more suitable for a particular application.

U.S. Pat. No. 4,174,358 issued Nov. 13, 1979 to B. N. Epstein is directed to thermoplastic polyamide compositions having improved ductility or toughness. The toughened thermoplastic compositions taught in Epstein contains 60 to 99% by weight of a polyamide matrix resin and 1 to 40% by weight of at least one other phase which contains another polymer dispersed as small particles within the polyamide matrix and having sites which adhere to the polyamide. The polymer modifier in the compositions taught by Epstein can be any of a wide variety of polymers provided that it meet certain requirements, e.g. that it have certain sites which adhere to the polyamide and that it meet a tensile modulus limitation of 1 to 20,000 psi.

Various other prior art concerned with improving the impact of polyamides is discussed in Columns 1 and 2 of the Epstein patent.

In U.S. Pat. No. 4,218,549 issued Aug. 19, 1980 to H. Jadamus et al. there are described compositions comprising a first component which is at least one polyamide and a second component described as at least one polyether ester amide. These compositions are said to exhibit improved flexibility and cold impact strength. The polyamide component is from omega-amino-carboxylic acids or lactams having at least 10 carbon atoms. The polyether ester amide component is prepared by hydrolytic polycondensation employing the aforementioned carboxylic acids or lactams, an alpha, omega-dihydroxy(polytetrahydrofuran) and a dicarboxylic acid.

In U.S. Pat. No. 3,549,724 issued to K. Okazaki et al. on Dec. 22, 1970 there are described polymer blends comprising a polyamide and a polyether-polyamide block copolymer. The block copolymer is prepared by the polycondensation reaction of a polyamide producing monomer selected from lactams, omega-amino acids and diamines combined with dicarboxylic acids, in the presence of a polyether having terminal groups selected from amino groups, organic acid salts of such amino groups, carboxyl groups, organic amine salts of such carboxyl groups and mixtures thereof. The compositions are said to have high and durable antistatic properties. The same K. Okazaki and others disclose an improvement in the teachings of U.S. Pat. No. 3,549,724 patent to obtain compositions which are said to have even better antistatic properties in U.S. Pat. No. 3,639,502 issued Feb. 1, 1972. Polyamide-based compositions taught therein similarly are blends of a polyamide and a polyether-polyamide block copolymer.

In U.S. Pat. No. 3,636,135 issued Jan. 18, 1972 to J. D. Garforth et al. compositions said to be resistant to static electrification are disclosed which comprise an admixture of a synthetic linear polyamide and a polyetheresteramide which is a condensation product of an aliphatic dicarboxylic acid, a hydroxypolyoxyalkylene compound and certain amino acids, lactams, diamines or combinations thereof.

The present invention relates to novel compositions comprising a blend of a polyamide resin and a particular block polymer having polyamide segments, other polymeric segments and acyl lactam groups or imide residues thereof. This invention provides useful engineering thermoplastic compositions. Improved properties over the polyamide resin alone, e.g., improved resistance to break upon impact as measured by the notched Izod test ASTM D-256-56, are obtainable with the compositions of the present invention.

SUMMARY OF THE INVENTION

According to the present invention, there is provided a polyamide composition comprising:

(a) at least one polyamide resin of number average molecular weight of at least 5000; and (b) at least one block polymer having (i) from about 30 to about 70 weight percent polyamide segments selected from

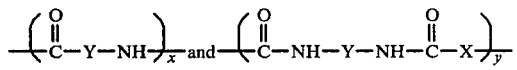

wherein x is an integer equal to five or more and y is an integer equal to three or more;

(ii) from about 70 to about 30 weight percent of segments having a molecular weight of at least 300 selected from the group consisting of segments of poly(ethylene oxide), poly(propylene oxide), polycaprolactone, polytetrahydrofuran, polybutadiene, polyisoprene, polyisobutylene, poly($C_1$-$C_8$ alkylene acrylate), poly($C_1$-$C_4$ dialkylene siloxane), poly(ethylene-co-propylene) poly(ethylene-co-carbon monoxide) and combinations thereof; said (ii) segments being connected to an (i) polyamide segment through groups selected from amide, ester, urea, carbamate and imide; and (iii) greater than 0.05 milliequivalents of

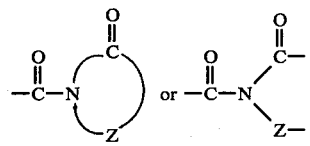

groups per gram of (b); wherein Y and Z are alkylene having from about 3 to about 14 carbon atoms and X is arylene or alkylene having from about 3 to about 14 carbon atoms;

provided that the composition contains from about 10 to about 90 weight percent of Component (a) and from about 90 to about 10 weight percent of Component (b).

Polyblends which exhibit improved impact resistance over the polyamide resin (a) alone are obtainable by intimately mixing a blend of Components (a) and (b) described above. The compositions of the present invention are particularly useful and engineering thermoplastics.

DETAILED DESCRIPTION OF THE INVENTION

The polyamide resins which may be employed in Component (a) of the compositions of the present invention are well known in the art and include those semi-crystalline and amorphous resins having a molecular weight of at least 5000 and commonly referred to as nylons. Suitable polyamides include those described in U.S. Pat. Nos. 2,071,250; 2,071,251; 2,130,523; 2,130,948; 2,241,322; 2,312,966; 2,512,606; and 3,393,210. The polyamide resin can be produced by condensation of equimolar amounts of a dicarboxylic acid containing from 4 to 12 carbon atoms with a diamine, in which the diamine contains from 4 to 14 carbon atoms. Excess diamine can be employed to provide an excess of amine end groups over carboxyl end groups in the polyamide. Examples of polyamides include poly(hexamethylene adipamide) (6,6 nylon), poly(hexamethylene azelaamide) (6,9 nylon), poly(hexamethylene sebacamide) (6,10 nylon), and poly(hexamethylene dodecanoamide) (6,12 nylon), the polyamides produced by ring opening of lactams, e.g., polycaprolactam, polylauryllactam and poly(11-aminoundecanoic acid). Preferred polyamides are poly(hexamethyl adipamide) and polycaprolactam. It is also possible to use in this invention polyamides prepared by the copolymerization of two of the above polymer components or terpolymerization of the above polymer components, e.g., for example, an adipic, isophthalic acid hexamethylene diamine copolymer.

The compositions of the present invention contain from about 10 to about 90 percent, preferably from about 40 to 90 percent, by weight of Component (a) which is described as "at least one polyamide resin" to indicate that this Component can be a mixture of different polyamides as well as a single polyamide resin.

Component (b) in the compositions of the present invention can be described as one or more block polymers having (i) polyamide segments, (ii) segments of another polymer and (iii) acyl lactam groups or imide residues thereof, said block copolymers being more particularly described herein. It has been found that such block polymers can be blended with the polyamide resins employed as Component (a) herein to form polyblends with improved impact resistance over the particular polyamide resins alone.

More particularly, Component (b) is at least one block polymer having (i) from about 30 to about 70 weight percent polyamide segments selected from

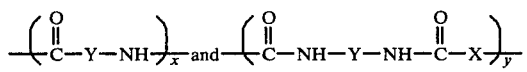

wherein x is an integer equal to five or more and y is an integer equal to three or more;

(ii) from about 70 to about 30 weight percent of segments having a molecular weight of at least 300 selected from the group consisting of segments of poly(ethylene oxide), poly(propylene oxide), polycaprolactone, polytetrahydrofuran, polybutadiene, polyisoprene, polyisobutylene, poly($C_1$-$C_8$ alkylene acrylate), poly($C_1$-$C_4$ dialkylene siloxane), poly(ethylene-co-propylene), poly(ethylene-co-carbon monoxide) and combinations thereof; said (ii) segments being connected to an (i) polyamide segment through groups selected from amide, ester, urea, carbamate and imide; and (iii) greater than 0.05 milliequivalents of

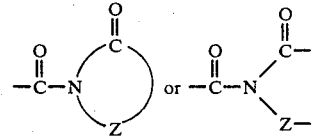

groups per gram of (b); wherein Y and Z are alkylene having from about 3 to about 14 carbon atoms and X is arylene or alkylene having from about 3 to about 14 carbon atoms.

The polyamide segments (i) in the Component (b) block polymer would in general be derived from a lactam monomer (preferably containing 4 to 12 carbons) to result in

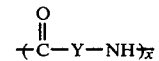

segments (i.e. polylactam segments), or from an aromatic or aliphatic dicarboxylic acid typically containing from about 4 to about 12 carbon atoms reacted with an aliphatic diamine typically containing from about 4 to about 14 carbons to result in

segments. The polylactam segments are preferred. The (i) segments represent nylon blocks in the Component (b) block polymer. The size of these nylon blocks can vary within the block polymer with x generally being an integer equal to five or more and y generally being an integer equal to three or more. Preferred values for x and y are integers from about 5 to about 40.

The (ii) segments in the Component (b) block polymer have a molecular weight of at least 300, preferably 300 to about 5000. Reference herein to molecular weights means number average molecular weight, the determination of which is within the skill of the art. These segments are selected from the group consisting of segments of poly(ethylene oxide), poly(propylene oxide), polycaprolactone, polytetrahydrofuran, polybutadiene, polyisoprene, polyisobutylene, poly($C_1$-$C_8$ alkylene acrylate), poly($C_1$-$C_4$ dialkylene siloxane), poly(ethylene-co-propylene), poly(ethylene-co-carbon monoxide) and combinations thereof. The carbon atom ranges indicated in the case of the acrylate and siloxane apply to the alkylene groups.

It is to be understood that it is intended that the polymers listed in the aforementioned group encompass comonomeric modifications of such polymers so long as the major portion (i.e. greater than 50% by weight, and preferably greater than 80% by weight) of the polymer is derived from the specific type(s) of monomer(s) indicated. Co-monomeric modifications of such polymers are well known in the art and would be within the scope of the present invention provided a corresponding segment is capable of being incorporated in a Component (b) block polymer which can be blended effectively with a Component (a) polyamide. Examples of such co-monomeric modifications are poly(ethylene-co-propylene-co-diene monomer), poly(propylene oxide-co-allyl glycidyl ether), poly(butadiene-co-styrene), poly(butadiene-co-acrylonitrile), poly(butadiene-co-isoprene) and poly(butyl acrylate-co-acrylonitrile). The (ii) segments may also be derived from a polymer which is a combination of polymers in the aforementioned group, for example, poly(propylene oxide-co-ethylene oxide). Those skilled in the art would recognize a wide variety of other such modifications possible to the polymers listed in the aforementioned group.

The (ii) segments may be present in the block polymer in varying chain lengths and may contain branching and/or cross-linking. Also, the block polymer may contain (ii) segments of various types of polymers.

In general, the (ii) segments would be amorphous and elastomeric, that is, these segments would manifest a glass transition temperature below 10° C., preferably below minus 10° C., in the block polymer and/or the blend of Components (a) and (b). Methods for determination of the glass transition temperature would be within the skill of the art, for example, by dynamic mechanical measurements or differential scanning calorimetry under appropriate conditions for the particular material being analyzed.

Preferred (ii) segments are poly(propylene oxide), polytetrahydrofuran, poly(dimethyl siloxane), and polybutadiene, with poly(propylene oxide) particularly preferred.

The (ii) segments are connected to the polyamide segments through

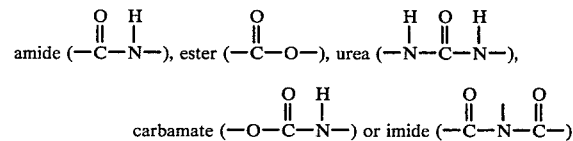

linkages. Preferred linking groups are amide, ester and imide. Even more preferred are amide, ester and imide linkages derived from adipoly-bis-caprolactam, isophthaloyl-bis-caprolactam or terephthaloyl-bis-caprolactam.

The Component (b) block polymers also contain

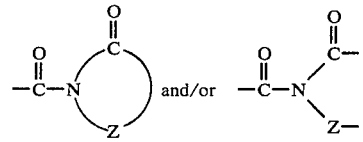

groups (herein collectively referred to as "acyl lactam groups or imide residues thereof") wherein Z is as defined hereinbefore. A preferred lactam is caprolactam, i.e. wherein Z has five carbon atoms. The acyl lactam group could be a pendant or terminal group whereas the imide residue thereof would generally represent a branch point. Reference herein to amount of these groups means the collective amount of groups present as either of the structures shown above. It is believed that these groups react with the amine or possibly even amide groups in the Component (a) polyamide resin to result in adherence between Components (a) and (b) of the compositions of the present invention.

The Component (b) block polymers would typically contain from about 30 to about 70 weight percent of polyamide (i) segments, from about 70 to about 30 weight percent of (ii) segments and greater than 0.05 milliequivalents of (iii) groups per gram of block polymer. Effective impact enhancement would generally result with elastomeric (ii) segments comprising from about 3 to about 50 percent by weight of the total of Components (a) and (b) of the compositions of the present invention. Impact enhancement herein means that the composition of the present invention comprising Components (a) and (b) gives higher impact resistance than the polyamide component (a) alone. Improved impact resistance would be shown in the notched Izod Impact Test ASTM D 256-56A and/or the Gardner Mutiaxial Test described hereinafter. Impact results can generally be increased from about two-fold to 15-fold or greater.

It is to be understood that the inclusion of other segments in the Component (b) block copolymers is possible so long as the presence thereof does not prevent the block copolymer from being effectively compatible when blended with a polyamide Component (a). It should also be understood that the block copolymers may contain substantial branching and/or cross-linking.

The block copolymers employed as Component (b) in the present invention may be prepared by methods known in the art. For example, U.S. Pat. Nos. 3,862,262, issued Jan. 21, 1975 and 4,031,164, issued June 21, 1977, both to R. M. Hedrick et al. describe lactam-polyol-acyl polylactam polymers which may be employed as Component (b). These patents are herein incorporated by reference.

As described in the Hedrick et al. patents, lactam-polyol-acyl polylactam polymers are prepared by reacting together a lactam monomer, a polyol and an acyl polylactam in the presence of a base catalyst for the anhydrous polymerization of a lactam. The lactam monomer which forms the polymerized lactam component of the polymer can be selected from cyclic monomeric lactams of the formula:

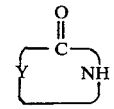

where Y is an alkylene group having at least about 3 carbon atoms, preferably from about 3 to 12 or 14 and more preferably from about 5 to about 11 carbon atoms. A monomer disclosed as preferred is ε-caprolactam. Lactam monomers in addition to ε-caprolactam include alpha-pyrrolidinone, piperidone, valerolactam, caprolactams other than the ε-isomer, capryllactam, lauryllactam and the like. In addition to lactams unsubstituted on their carbon chains, lactams having substituents on the carbon chain which do not inhibit or otherwise adversely affect the polymerization of the lactam are also said to be included.

During polymerization the cyclic lactam ring is opened to provide the following monomeric unit

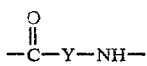

which, together with other lactam molecules, produces a polymeric block of the formula

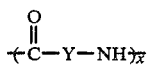

where x and Y can be as previously defined herein.

Polymerized polyol segments in the Hedrick polymers are formed from polyol components having at least two hydroxy groups. A large number of suitable polymeric polyols such as poly(propylene oxide) diol and poly(ε-caprolactone) diol are disclosed. Commercially available polymeric polyols typically have molecular weights from 200 to 5000.

The acyl polylactam component in the Hedrick reaction mixture forms a linkage between the polymerized polyol segments and the lactam polymer segments. Exemplary acyl polylactams include terephthaloyl bis-caprolactam, i.e.

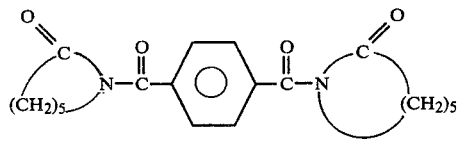

adipoyl bis-caprolactam, malonyl bis-pyrrolidinone; succinoyl bispyrrolidinone; glutaroyl bis-piperidone; glutaconoyl bis-piperidone; 2-ethyl-2-phenyl-glutaroyl bis-valerolactam; 2,3-diethylsuccinoyl bis-caprolactam; pimeloyl bis-capryllactam; sebacoyl bis-caprolactam; phthaloyl bis-piperidone; isophthaloyl bis-dodecanolactam; trimesoyltris-caprolactam; (1,3,5-benzene tricarbonyltris-caprolactam); 1,2,3,5-benzenetetracarbonyl tetrakiscaprolactam; 1,2,3,4-naphthalenetetracarbonyl-tetrakispiperidone and 1,4-cyclohexanedicarbonyl biscaprolactam.

Polymerization temperatures for preparing the Hedrick polymers can vary from the melting point of the lactam or less up to the melting point of the resultant polymer or more. Depending upon the particular ingredients being used, this can encompass a range from 70° to 230° C. or more. Preferred polymerization temperatures are from about 90° to about 190° C., and more preferably from about 120° to about 180° C. for caprolactam polymers. Even more preferred is a polymerization where the temperature is increased during the polymerization from an initial temperature of from about 70° to about 100° C. at the beginning of the polymerization to a final temperature of about 150° to 180° C. Such a technique produces a rapid polymerization of a polymer having high strength and modulus.

Times required for complete polymerization will vary considerably depending upon polymerization temperatures and the specific ingredients used in the polymerization system. Total polymerization time can be as little as 30 seconds or less, preferably from 1 to 10 minutes, and can be extended to any duration up to several days or more. Generally, polymerization times of from 1 to 10 minutes are preferred for most polymerization systems.

The lactam polymerization catalyst disclosed as useful by Hedrick et al. includes that class of compounds commonly recognized as suitable basic catalysts for the anhydrous polymerization of lactams. In general, all alkali or alkaline earth metals are effective catalysts either in the metallic form or in the form of hydrides, halohydrides, alkylhalides, oxides, hydroxides, carbonates and the like. Also useful are a number of organometallic compounds of the metals mentioned above such as metal alkyls, metal phenyls, metal amides and the like. Examples include sodium hydride, potassium hydroxide, lithium oxide, ethyl magnesium bromide, calcium fluorohydride, strontium carbonate, barium hydroxide, methyl sodium, butyl lithium, potassium phenyl, diphenyl barium, sodium amide and magnesium diethyl. All of the foregoing compounds react with the lactam monomer to form the metal lactam, which is the active catalytic agent in the lactam polymerization mechanism. The metal lactam catalyst can therefore be formed in situ by reaction of one of the foregoing metal or metal compounds with lactam monomer in the polymerization medium or by prior reaction of the metal or metal compound with a stoichiometric quantity of lactam monomer. Examples of metal lactam catalysts include sodium caprolactam, magnesium caprolactam bromomagnesium pyrrolidinone, chlorocalcium caprolactam and the like. Catalyst concentrations can range from a fraction of one mole percent to 15 or 20 or more mole percent of the lactam monomer to be polymerized.

The preparation of block polymers other than those taught in Hedrick et al. which can be employed as Component (b) herein is within the skill of the art. For example, it is well-known that polymeric nylons derived from diamines and dicarboxylic acids can be coupled to elastomeric diamino materials using an acylpolylactam coupling agent. Alternatively, such nylons can be coupled to elastomeric diamino or diol materials using polyisocyanate coupling agents. In these processes it would be essential to provide the acyl lactam groups or imide residues thereof (the (iii) groups) of the block polymers useful in the present invention. This could be done by using an appropriate amount of acylpolylactam coupling agent, or in the case of the process employing a polyisocyanate coupling agent by incorporating some acylpolylactam at a proper stage in the process.

The compositions of the present invention contain from about 10 to about 90, preferably about 40 to about 90, weight percent of Component (a) and from about 90 to about 10, preferably 60 to about 10, weight percent of Component (b), said weight percents being of the total weight of the composition. Other ingredients may be included in the compositions of the present invention. Such ingredients may be introduced with Component (a) or (b), introduced as a separate component blended with Components (a) and (b), introduced as a separate component after (a) and (b) are blended, or otherwise. Typical ingredients which might be desirable in a composition of the present invention for use as a molding resin include stabilizers and inhibitors of oxidative, thermal, and ultraviolet light degradation; lubricants and mold release agents, colorants, fillers and reinforcing agents, nucleating agents, plasticizers, flame retardant agents, etc. Generally such additives will comprise less than 45 percent by weight of a composition within the present invention.

The compositions of the present invention may be a simple mixture of Components (a) and (b) or a more intimate blend of the components. Various conventional means may be employed to provide a substantially uniform mixture of Components (a) and (b). More intimate mixing can be achieved by melt-blending, that is, blending of the materials in molten states. Conventional means well-known to those skilled in the art for intimately mixing plastics may be employed, for example, a Banbury mixer, a roll mill, and single or twin screw extruders.

The following examples are provided to illustrate the present invention and are not to be construed as limiting in any way. Unless otherwise indicated, parts and percentages are expressed in terms of weight.

EXAMPLES 1–6

Preparation of Polyamide - Polyol - Acyl Lactam Functional Block Polymers

Caprolactam - polypropylene glycol-isophthaloyl bis-caprolactam block polymers were prepared using the ingredients in the amounts expressed in parts by weight shown in Table I.

TABLE I

| Material | Ex. 1 | Ex. 2 | Ex. 3 | Ex. 4 | Ex. 5 | Ex. 6 |
|---|---|---|---|---|---|---|
| Varanol 2120[1] | 8165 | 1800 | 2400 | 8575 | 7348 | 1050 |
| Caprolactam | 6599 | 1530 | 822 | 6854 | 7548 | 2020 |
| Isophthaloyl bis-caprolactam | 1686 | 381 | 489 | 1817 | 1533 | 259 |
| Catalyst Solution[2] | 1794 | 396 | 396 | 1906 | 211 | 270 |
| Flectol® H[3] | 91 | 20 | 20 | 95 | 82 | 17 |
| Potassium Iodide[4] | 0 | 12 | 12 | 0 | 0 | 0 |
| Cupric Acetate[4] | 0 | 1.2 | 1.2 | 0 | 0 | 0 |
| Decyl Alcohol | 0 | 0 | 0 | 217 | 134 | 39 |

[1]A poly(propylene oxide) diol, sold by Dow Chemical Co., having molecular weight of about 2000.
[2]Bromomagnesium caprolactam, 0.4 molar, in caprolactam.
[3]Antioxidant sold by Monsanto Co. which is polymerized 1,2-dihydro-2,2,4-trimethylquinoline.
[4]Heat stabilizer.

In the preparation of the block polymers of Examples 1–6 the poly(propylene oxide) diol, caprolactam, Flectol® H and heat stabilizers (if used) are mixed together; 100 parts by weight of caprolactam with any trace amounts of water are removed by vacuum distillation. Then the isophthaloyl bis-caprolactam and decyl alcohol (if used) are added, mixed thoroughly, and this resultant dry "polyol" solution is held at 90° C. The polyol solution is then mixed with the catalyst solution, also held at 90° C., by pumping the two solutions together through a ¼-inch Kenics static mixer and then into a vertical ½-inch thick heated metal mold cavity. The flow rates of the two solution streams are adjusted to be in direct proportion to their total initial volumes. After the two solutions are pumped, with mixing, into the mold, the mold temperature is increased to 160° C. over a period of 15 minutes, then held at 160° C. for 30 minutes, after which it is cooled. The polymer product is then removed as a solid slab. The sample composition was then ground into a form suitable for blending with pelletized nylon resin.

The block polymers thus prepared contained nylon blocks derived from caprolactam and polyol blocks derived from the poly(propylene oxide) with the isophthaloyl bis-caprolactam residues providing a linkage between these blocks. The block polymers contained pendant, terminal and/or branch point acyl lactam groups or imide residues thereof which in general are provided in the above described process when the moles of terephthaloyl bis-caprolactam in the reaction mixture is greater than the moles of hydroxyl. The equivalents of these groups is substantially lower in the Example 4–6 block polymers (used in Comparative Examples hereinafter) which employed decyl alcohol as a coreactant. Certain characteristics of the polymers thus prepared are shown in Table II.

TABLE II

| | Block Polymer Characteristics | | |
|---|---|---|---|
| | Polyol Segments Weight % In Polymer | Polyol Segments Approx. Mol. Weight | Approximate Milliequivalents Functionality[a] per Gram of Block Polymer |
| Ex. 1 | 45% | 2036 | 0.080 |
| Ex. 2 | 45% | 1975 | 0.079 |
| Ex. 3 | 60% | 1975 | 0.079 |
| Ex. 4 | 45% | 1975 | 0.0078 |
| Ex. 5 | 44% | 2011 | 0.027 |
| Ex. 6 | 30% | 1975 | 0.041 |

[a]Milliequivalents of acyllactam groups and imide residues thereof per gram of block polymer determined in these examples as follows: 2000 [(grams of isophthaloyl bis-caprolactam ÷ 356) - (grams of polypropylene oxide diol ÷ molecular weight of polypropylene oxide diol) - (grams of decyl alcohol ÷ 158 ÷ 2)] ÷ [grams of polypropylene oxide diol + grams of isophthaloyl bis-caprolactam + grams of caprolactam[b] + grams of decyl alcohol + grams of catalyst solution].
[b]Initial charge minus amount removed via vacuum distillation prior to reaction.

EXAMPLES 7–29

The block polymers prepared in Examples 1–6 were blended with nylon resins shown in Table III. VYDYNE R-100 is a mineral-filled nylon 6,6 injection moldable resin sold by Monsanto Co. containing about 40 percent by weight mineral filler.

TABLE III

| | Nylon Resins |
|---|---|
| A | Nylon 6,6 |
| B | VYDYNE® R-100 |

The properties of the resulting compositions comprising a block polymer of Examples 1–6 and a nylon resin (from Table III) are shown in Table IV.

TABLE IV

| Example | Nylon-Weight % | Block Polymer-Weight % | Weight % Polyol Segments in Blend | IMPACT Izod, Ft. lbs/in | IMPACT Gardner in-lbs. | Flexural Mod., KSI | Tensile Strength, KSI |
|---|---|---|---|---|---|---|---|
| 7 | A - 100 | - 0 | 0 | 0.6–0.8 | >160 | 366–433 | 10.9–11.8 |
| 8 | A - 80 | Ex. 1 - 20 | 9.0 | 2.7 | | 280 | 8.5 |
| 9 | A - 75 | Ex. 1 - 25 | 11.25 | 3.9 | | 225 | 6.9 |
| 10 | A - 70 | Ex. 1 - 30 | 13.5 | 5.8 | | 247 | 7.2 |
| 11 | A - 60 | Ex. 1 - 40 | 18 | 12.7 | | 196 | 6.9 |
| 12 | A - 50 | Ex. 1 - 50 | 22.5 | 13.3 | | 175 | 5.7 |
| 13 | A - 78 | Ex. 2 - 22 | 10 | 2.6 | | 300 | 8.4 |
| 14 | A - 67 | Ex. 2 - 33 | 15 | 3.9 | | 252 | 7.2 |
| 15 | A - 56 | Ex. 2 - 44 | 20 | 11.9 | | 207 | 6.2 |
| 16 | A - 83.3 | Ex. 3 - 12.7 | 10 | 2.5 | | 312 | 8.9 |
| 17 | A - 75 | Ex. 3 - 25 | 15 | 7.9 | | 282 | 7.8 |
| 18 | A - 67 | Ex. 3 - 33 | 20 | 14.8 | | 219 | 6.1 |
| 19 | A - 60 | Ex. 4 - 40 | 18 | 2.5 | | 230 | 7.8 |

TABLE IV-continued

| Example | Nylon-Weight % | Block Polymer-Weight % | Weight % Polyol Segments in Blend | IMPACT Izod, Ft. lbs/in | IMPACT Gardner in-lbs. | Flexural Mod., KSI | Tensile Strength, KSI |
|---|---|---|---|---|---|---|---|
| 20 | A - 59 | Ex. 5 - 41 | 18 | 2.8 | | 210 | 6.9 |
| 21 | A - 40 | Ex. 6 - 60 | 18 | 3.3 | | 196 | 6.5 |
| 22 | B - 100 | - 0 | 0 | 0.86 | 104 | 843 | 13.9 |
| 23 | B - 93.3 | Ex. 2 - 6.7 | 3 | 1.07 | 85 | 780 | 12.2 |
| 24 | B - 86.7 | Ex. 2 - 13.3 | 6 | 1.27 | 156 | 641 | 10.8 |
| 25 | B - 80 | Ex. 2 - 20 | 9 | 1.73 | 118 | 619 | 9.4 |
| 26 | B - 95 | Ex. 3 - 5 | 3 | 1.10 | 112 | 794 | 12.4 |
| 27 | B - 90 | Ex. 3 - 10 | 6 | 1.30 | 156 | 686 | 11.2 |
| 28 | B - 85 | Ex. 3 - 15 | 9 | 1.63 | >160 | 597 | 9.9 |
| 29 | A/B - 12.5/87.5 | - 0 | 0 | 0.85 | 126 | 720 | 13.9 |

Example 7 is a control with the results for the properties representing a range obtained in various runs of nylon 6,6 (Nylon A of Table III) with no impact modifier. Example 22 is a control for VYDYNE® R100 (Nylon B of Table III).

Examples 8-18 and 23-28 are compositions of the present invention comprising a blend of a nylon resin and a block polymer. The block polymer and the nylon resin were intimately melt-blended by injection molding in a reciprocating screw injection molder. The molded articles thus formed were ground and redried prior to remolding of specimens for property determinations reported in Table IV. These Examples demonstrate that nylon compositions with improved impact strength are achievable with compositions of the present invention. In the compositions employing mineral filled nylon (Examples 23-28) Gardner impact results are especially significant since the addition of mineral filler to nylon 6,6 generally causes a substantial reduction in the multiaxial impact strength of a product. Significant improvements in multiaxial impact strength is demonstrated with compositions of the present invention employing mineral filled nylon.

Example 29 is a control to indicate the effect on properties of mineral filled nylon 6,6 by reduction in percent mineral filler present by blending with unfilled nylon 6,6. The percent mineral filler in Example 29 is 35 percent which corresponds to the lowest amount of filler in the Examples 23-28 (viz, Example 25).

Examples 19-21 (prepared as described above for Examples 8-18 and 23-29) demonstrate the lower enhancement of impact strength with the block polymers of Examples 4-6 which contain substantially lower amounts of acyllactam groups or imide residues thereof. Example 19 can be contrasted to the related Example 11.

The properties reported in Table IV were determined substantially in accordance with the following procedures:

Izod Impact Strength—ASTM D-256, 0.01±0.001 inch radius notch (Method A). Specimens were $\frac{1}{2}$ inch $\times \frac{1}{4}$ inch $\times 5$ inch rectangular injection molded bars. Reported results are representative of impact strength in the center of the bar.

Gardner Impact Strength—Gardner Reverse Impact Tester, Model IG-1120 using circular 2 in. diameter, $\frac{1}{8}$ in. thick disc specimens. Dart hemispherical tip of 0.625 in. diameter impacted downward with a 2- or 4-lb. hammer from varying height (inches) until failure determined by break or crack. The product of the hammer weight and height represents an impact energy. The results reported represent the maximum impact energy at which more than half of a number of specimens tested pass without failure. A representative number of specimens to test is 12-16.

Tensile Strength—ASTM D-638 using $\frac{1}{8}$ inch thick Type I tensile bars with 2 inch gauge length and 0.2 in./min. cross-head speed. Result in thousand pounds per square inch (KSI).

Flexural Modulus—ASTM D-790 using cross-head speed of 0.05 in./min. Specimens were $\frac{1}{4}$ in. $\times \frac{1}{2}$ in. $\times 5$ in. Result in thousand pounds per square inch (KSI).

What is claimed is:

1. A composition comprising:
   (a) at least one polyamide resin of number average molecular weight of at least 5000; and
   (b) at least one block polymer having
      (i) from about 30 to about 70 weight percent polyamide segments selected from

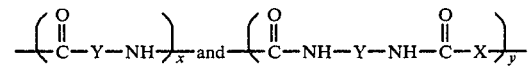

wherein x is an integer equal to five or more and y is an integer equal to three or more;
      (ii) from about 70 to about 30 weight percent of segments having a molecular weight of at least 300 selected from the group consisting of segments of poly(ethylene oxide), poly(propylene oxide), polycaprolactone, polytetrahydrofuran, polybutadiene, polyisoprene, polyisobutylene, poly($C_1$-$C_8$ alkylene acrylate), poly($C_1$-$C_4$ dialkylene siloxane), poly(ethylene-co-propylene), poly(ethylene-co-carbon monoxide) and combinations thereof; said (ii) segments being connected to an (i) polyamide segment through groups selected from amide, ester, urea, carbamate and imide; and
      (iii) greater than 0.05 milliequivalents of

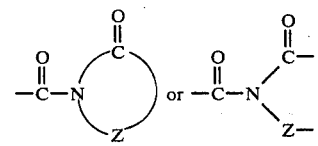

groups per gram of (b); wherein Y and Z are alkylene having from about 3 to about 14 carbon atoms and X is arylene or alkylene having from about 3 to about 14 carbon atoms;
   provided that the composition contains from about 10 to about 90 weight percent of Component (a) and from about 90 to about 10 weight percent of Component (b).

2. A composition in accordance with claim 1 wherein the (i) segments of the block polymer are

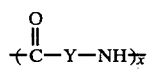

wherein x is an integer equal to five or more and Y is alkylene having from about 3 to about 11 carbon atoms.

3. A composition in accordance with claim 1 wherein the (ii) segments of the block polymer are selected from poly(propylene oxide), polytetrahydrofuran, polybutadiene and poly(dimethyl siloxane).

4. A composition in accordance with claim 1 wherein the (ii) segments are connected to the (i) polyamide segments through groups selected from amide, ester and imide.

5. A composition in accordance with claim 4 wherein said groups selected from amide, ester and imide are derived from adipoyl-bis-caprolactam, isophthaloyl-bis-caprolactam or terephthaloyl-bis-caprolactam.

6. A composition in accordance with claims 1, 2, 3, 4 or 5 wherein the polyamide resin of Component (a) is selected from poly(hexamethylene adipamide) and polycaprolactam.

7. A composition in accordance with claim 6 wherein Component (a) is present at from about 40 to about 90 percent by weight of the composition and Component (b) is present at from about 60 to about 10 percent by weight of the composition.

8. A composition in accordance with claim 6 wherein Z has five carbon atoms.

9. A composition in accordance with claim 7 wherein Z has five carbon atoms.

10. A composition comprising:
(a) at least one polyamide resin of number average molecular weight of at least 5000, said polyamide being selected from poly(hexamethylene adipamide) and polycaprolactam; and
(b) at least one block polymer having
  (i) from about 30 to about 70 weight percent of

polylactam segments, wherein x is an integer equal to five or more and Y is alkylene having from about 3 to about 11 carbon atoms;
  (ii) from about 70 to about 30 weight percent of segments having a molecular weight of at least 300 selected from the group consisting of segments of poly(propylene oxide), polytetrahydrofuran, polybutadiene and poly(dimethyl siloxane); said (ii) segments being connected to the (i) polylactam segments through groups selected from amide, ester and imide groups derived from adipoylbis-caprolactam, isophthaloyl-bis-caprolactam or terephthaloyl-bis-caprolactam; and
(iii) greater than 0.05 milliequivalents of

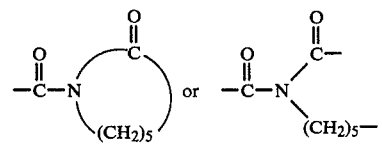

groups per gram of (b);
provided that the composition contains from about 40 to about 90 weight percent of Component (a) and from about 60 to about 10 weight percent of Component (b).

11. A composition in accordance with claim 10 wherein Component (a) is poly(hexamethylene adipamide).

12. A composition in accordance with claim 10 wherein the (i) segments are

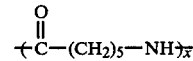

ps and the (ii) segments are segments of poly(propylene oxide) having average molecular weight from about 300 to about 5000.

* * * * *